United States Patent [19]

Shome et al.

[11] Patent Number: 5,909,381
[45] Date of Patent: Jun. 1, 1999

[54] SYSTEM OF ON BOARD PREDICTION OF TRAJECTORIES FOR AUTONOMOUS NAVIGATION OF GPS SATELLITES

[75] Inventors: Pradipta Shome, Mountain Lakes; Lawrence Doyle, Hazlet, both of N.J.

[73] Assignee: ITT Manufacturing Enterprises, Inc., Wilmington, Del.

[21] Appl. No.: 08/802,620

[22] Filed: Feb. 19, 1997

[51] Int. Cl.[6] .................................................. G06F 17/00
[52] U.S. Cl. ........................... 364/578; 364/459; 342/357
[58] Field of Search .................................. 364/578, 459; 342/357, 352

[56] References Cited

U.S. PATENT DOCUMENTS

| | | | |
|---|---|---|---|
| 5,267,167 | 11/1993 | Glickman | 364/459 |
| 5,490,076 | 2/1996 | Rawicz et al. | 364/459 |
| 5,504,492 | 4/1996 | Class et al. | 342/357 |
| 5,585,800 | 12/1996 | Chubb | 342/357 |
| 5,594,454 | 1/1997 | Devereux et al. | 342/357 |
| 5,726,659 | 3/1998 | Kee et al. | 342/352 |
| 5,760,737 | 6/1998 | Brenner | 342/357 |

OTHER PUBLICATIONS

Avila et al., "An Overview of a Global Positioning System Mission Planner Implemented on a Personal Computer", IEEE Aerospace and Electronic Systems Magazine, Jan. 1990, pp. 10–18.

Schwarz et al., "Aided Versus Embedded: A Comparison of Two Approaches to GPS/INS Intergration", IEEE Position Location and Navigation Conference, Feb. 1994, pp. 314–322.

Sauer et al., "Determination of High–Precision Trajectories without fixing integer ambigities", IEEE Position Location and Navigation Conference, Feb. 1994, pp. 402–409.

"GPS Signal Structure and Performance Characteristics", *Journal of the Institute of Nagvigation*, vol. 25, No. 2, Summer 1978, by J.J. Spilker, Jr.

"The GPS Navigation Message", *Journal of the Institute of Navigation*, pp. 147–165, vol. 25, No. 2, Summer 1978 by A.J. Van Dierendonck et al.

"Closed Form Sun, Moon and Nutation Algorithms", *Aerospace Report*, ATR–93(3473)–1, Jan. 1993.

"Low Precision Formulae for Planetary Positions", *Astrophysical Journal*, Sup. Series, vol. 41, pp. 391–411, 1979 by T.C. Van Flandern et al.

"Discrete Square Root Filtering", Kalman Filtering: Theory and Application, *IEEE Press*, p. 210, 1985 by Kaminski et al.

"Modeling UT1–UTC and Polar Motion On–Board GPS Satellites", *Navigation Journal, Institute of Navigation*, vol. 31, No. 3, Fall 1984, Fergurson et al.

"Modified Encke Special Perturbation Method", *Astronomical Journal*, vol. 71, No. 7, Sep. 1966 by Kyner et al.

*Primary Examiner*—Kevin J. Teska
*Assistant Examiner*—Russell W. Frejd
*Attorney, Agent, or Firm*—Plevy & Associates

[57] ABSTRACT

A system and a method is disclosed for on board prediction of a trajectory for satellites, which can be implemented on a computer with a limited number of bits. The system includes a compact force model that approximate the forces that the satellite encounters in an earth orbit. The compact force model includes a two body force component, a non-spherical earth gravitational force component, a solar radiation pressure component and a lunar-solar perturbation force component. An adder is coupled to the force model for combining the force components to produce an equation of motion approximating the acceleration of the satellite. An integrator is included for integrating the equation of motion approximating the acceleration of said satellite to produce an equation of motion approximating the displacement of the satellite, wherein the equation of motion approximating the displacement of the satellite is a reference trajectory.

22 Claims, 3 Drawing Sheets

SYSTEM OF ON BOARD PREDICTION OF TRAJECTORIES FOR AUTONOMOUS NAVIGATION OF GPS SATELLITES

BACKGROUND OF THE INVENTION

Field of the Invention

The present invention relates generally to satellite navigation and more particularly, to a system for predicting the trajectory of GPS satellites that can be implemented solely on board the satellite.

Description of the Prior Art

The Global Positioning System (GPS) is a satellite network which was developed by the U.S. Department of Defense to provide the military with a position and velocity determination system. Although the GPS System was developed for the military, part of the signals produced by the system are not classified. Thus, military as well as civilian entities are allowed to develop devices that utilize the signals from the GPS Satellites.

The configuration and operation of the GPS System is well known. In an article by J. J. Spilker, Jr., entitled GPS SIGNAL STRUCTURE AND PERFORMANCE CHARACTERISTICS, Journal of the Institute of Navigation, Vol. 25, No. 2, summer 1978, the GPS System is described as a network of 24 satellites, wherein three of the satellites are spares. The network of 24 satellites are arranged in six orbit planes, which are each inclined by 55 degrees with respect to the earth's equatorial plane. The six orbit planes are also offset by 60 degrees in longitude of ascending node. The four satellites of each orbital plane are each in a circular pro-grade nominal 12 hour orbit. The altitude of each of the 24 GPS Satellites in approximate circular orbits is 19,652 Km from the earth.

An important aspect of the GPS System is satellite ephemeris, which is the orbital time history of a satellite in space with respect to an earth fixed frame of reference. Satellite ephemeris involves the prediction of a satellite's orbit or trajectory around the earth. Predicting the trajectory of the GPS Satellites is a complex process because such trajectories are not constant and the measurements are corrupted by determination and stochastic errors. The trajectories are changing due to a great number of factors. In an article by A. J. Van Dierendock et al., THE GPS NAVIGATION MESSAGE, Journal of the Institute of Navigation, Pg. 154, Vol. 25, No. 2, Summer 1978, the factors that affect the changing trajectories are disclosed as earth-mass attraction, second zonal attraction, lunar gravity, solar gravity, fourth zonal harmonics, and higher order terms solar radiation pressure and gravity anomalies.

The trajectory of a GPS Satellite is usually predicted by utilizing a parameter known as a reference trajectory, which is a rough prediction of the trajectory computed on ground. The reference trajectory is calculated by utilizing force models, encompassing the above mentioned factors. Due to such applications as air traffic control, geodetic and geophysical studies and time synchronization, there is an increasing need for precise prediction of the trajectory of the GPS Satellites. In order to meet these requirements, the trajectory predicted must be consistent with or better than the range measurement resolution, which is typically 3–4 nanoseconds. This requires a high fidelity force model in order to calculate the reference trajectory. Such high fidelity force models are derived from relatively large data files, which are available at the Jet Propulsion Lab in Pasadena, Calif. The force model would include such components as Two Body Forces, Lunar Perturbations, Representation of Non-Spherical Earth Gravitational Forces, Solar Gravitational Attraction and Radiation Pressure, Analytical Models of Nutation, Precession and Polar Motion Effects of the Earth. At present the limiting factors in the accuracy of this force model are the non-gravitational effects.

A problem with implementing such high fidelity force model is that the computers aboard the GPS Satellites do not have the capacity to support such a detailed model. The 1750A Computers aboard the GPS Satellites do not have enough numerical processing power or memory to support the large data files required by such models. Also, the 1750A Computers have a word length which is only 48 bits and does not provide the mathematical precision to accurately calculate the reference trajectory to sufficient precision.

Computers with the capacity to accurately implement a high precision force model are presently only available at ground facilities. These computers typically have more computer power and memory, and a word length of 64 or 128 bits. Such a computer cannot be put aboard a satellite because it would require more space, weight and power than what is available aboard the GPS and other typical spacecrafts. Thus, the reference trajectory must be calculated at a ground facility and then relayed back to the GPS Satellites in space via a ground link, as shown in FIG. 1. Such a configuration decreases the performance of the GPS System by decreasing the survivability, decreasing the accuracy of the navigation and increasing the upload requirements for the GPS Satellites. The above disadvantages could be eliminated if the reference trajectory is calculated on-board the GPS Satellites to sufficient numerical accuracy.

Therefore it is an object of the present invention, to provide a method for generating high precision reference trajectories for GPS Satellites that can be implemented and computed autonomously on-board the satellite. More generally, this method would be applicable to all spacecrafts that require a knowledge of its orbital position in order to fulfill its mission.

SUMMARY OF THE INVENTION

A system and a method is disclosed for on board prediction of a trajectory for satellites, which can be implemented on a computer with relatively small word length using only a limited number of bits. The system includes a compact force model that approximate the forces that the satellite encounters in an earth orbit. The compact force model includes a two body force component, a non-spherical earth gravitational force component, a solar radiation pressure component and a lunar-solar perturbation force component. An adder is coupled to the force model for combining the force components to produce an equation of motion approximating the acceleration of the satellite. An integrator means is included for performing quadrature of the equations of motion approximating the accelerations acting on the satellite to produce a set of equations accurately predicting the positional and velocity displacement of the satellite, wherein the equations of motion approximating the displacement of the satellite is the reference trajectory.

The system and method further includes a means for forming the reference trajectory into an Enhanced Kepler Parameter Form. A subtracter is included for producing a difference expression which is the difference between the reference trajectory in the Enhanced Kepler Parameter Form and a crosslink measurement of range. A sequential estimator is coupled to the subtracter which generates a prediction of the trajectory of the satellite from the difference expression.

BRIEF DESCRIPTION OF THE DRAWINGS

The above objects, further features and advantages of the present invention are described in detail below in conjunction with the drawings, of which.

DETAILED DESCRIPTION OF THE DRAWINGS

Figure 1:
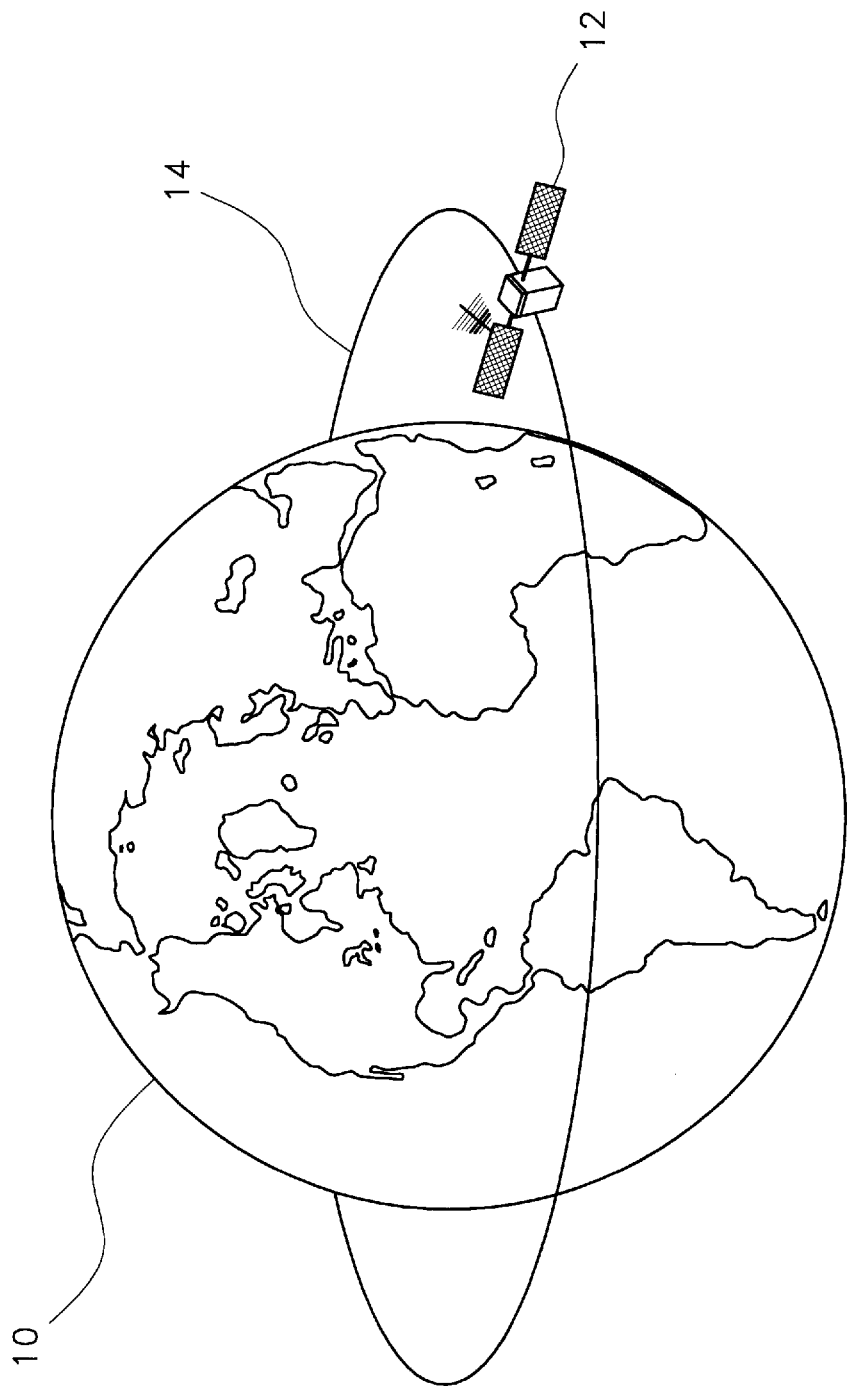
FIG. 1 is a diagram of a satellite following a trajectory around the earth.

Referring to FIG. 1, there is shown an example of a trajectory 14 that a GPS Satellite 12 would take around a planet such as earth 10. In the case of the GPS System, there are a Constellation of 24 satellites that follow trajectories around the earth. As previously discussed, predicting the trajectory 12 is an important requirement for GPS System applications. Presently, the reference trajectory which is utilized to predict the actual trajectory 14 of the satellite 12 is calculated at a ground facility. The present invention involves a system for accurately predicting the trajectory 14, which is implemented on board the satellite 12.

A number of advantages can be attained by predicting the trajectory 14 on board the satellite 12. The survivability of the satellite 12 can be increased because the trajectory computations are performed autonomously on board. This enables the satellite 12 to continue performing its mission for at least 210 days after the loss of a ground link. Also, the upload data requirements for the satellite 12 is reduced because the reference trajectory data is no longer included. Further, because each satellite 12 performs its own processing, a malfunction of a single satellite would not affect the remainder of the GPS Constellation Satellites.

Another advantage relates to the elimination of any error due to the trajectory data being aged when relayed to the satellite 12. Such errors can cause the deviation and difference of the computed trajectory from the reference trajectory to be very large, which may be outside the range of linear assumptions on which the deviation is based. In contrast, according to the present invention the trajectory 14 is calculated and propagated as often as a measurement is made. This avoids aging of the trajectory data and limiting the growth of any error, which would result in the large deviations between the computed and reference trajectory. Thus, ensuring that the most current and best trajectory information is provided to the satellite 12 for dissemination to the navigation users.

Figure 2:
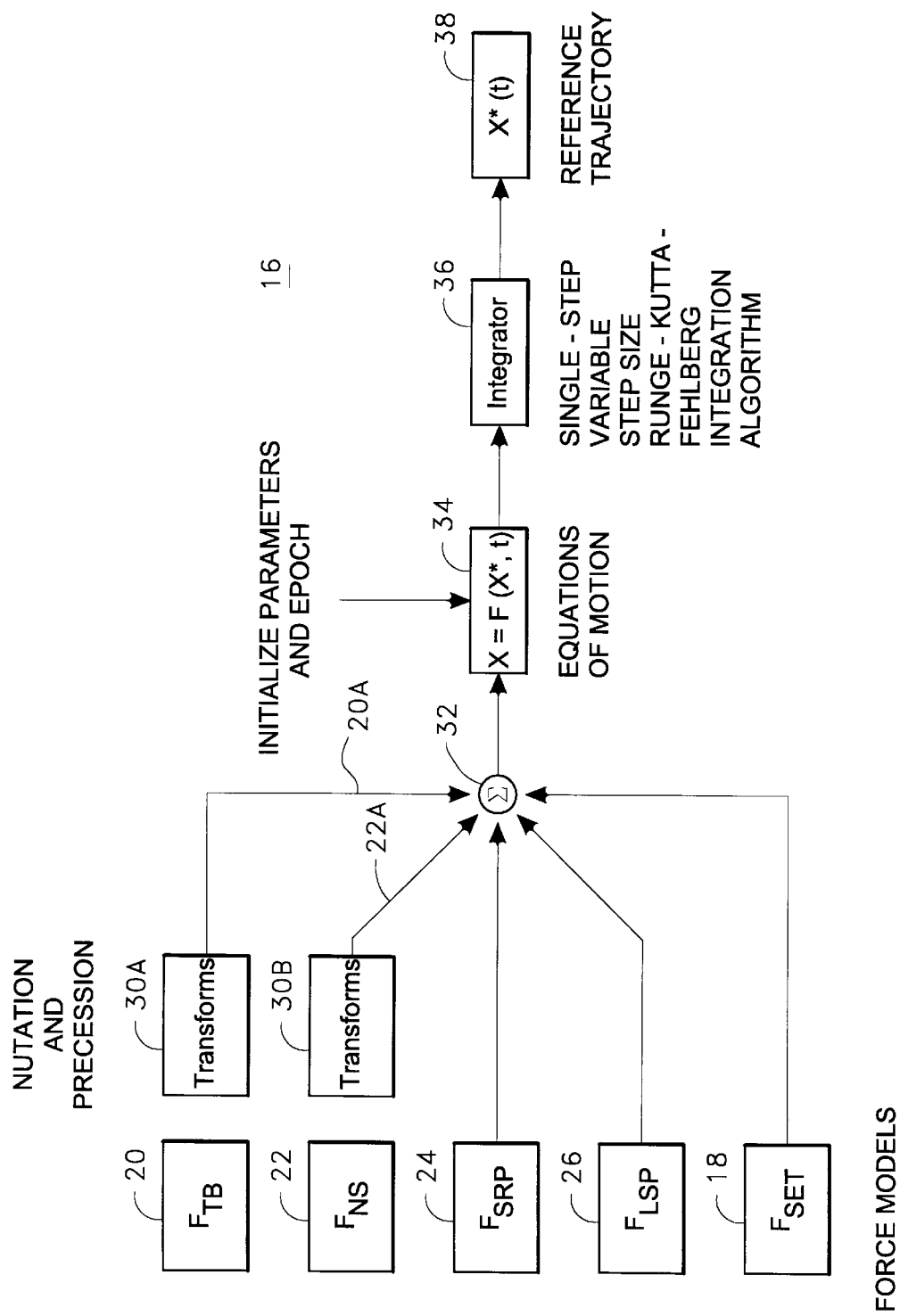
FIG. 2 is a block diagram of a system for on board calculation of a GPS Satellite reference trajectory according to the present invention.

Referring to FIG. 2, a block diagram of the system for on board calculation of a GPS Satellite reference trajectory 14 according to the present invention is shown. The system 16 is preferably implemented on a programmable computer system. In particular, the system 16 is capable of being implemented on a 1750A Computer System, which is the type of computer presently on board the GPS Satellites. Thus, the System 16 of the present invention provides a cost affective enhancement for the GPS System.

The system 16 includes a compact force model 18, which approximates the forces that influence a satellite's trajectory in an earth orbit. These forces include a $F_{TB}$ component 20, a $F_{NS}$ component 22, a $F_{SRP}$ component 24, a $F_{LSP}$ component 26 and a $F_{SET}$ component 28.

The compact force model 18 of the present invention differs in that it is derived from data files which are smaller than the data files required for the high precision force models described in the prior art. The smaller data files enable the compact force model 18 to be implemented on the lower capacity GPS Satellite Computers. The data files required to derive the force model 18 of the present invention are disclosed in an article written by T. C. Van Flandern et al., entitled LOW PRECISION FORMULAE FOR PLANETARY POSITIONS, Astrophysical Journal, Sup. Series, Vol. 41, pg. 391–491,1979. It has been determined that the force model derived from the above data files provides a reference trajectory that is accurate enough to predict the trajectory of a GPS Satellite for the applications described in the prior art.

The $F_{TB}$ component 20 approximates the two body force encountered by a satellite in an earth orbit. The two body force is the force generated by the mutual attraction between the earth and a satellite. The two body force component is the predominant force component that influences a satellites trajectory in an earth orbit.

The $F_{NS}$ component 22 approximates the non-spherical earth gravitational forces encountered by a satellite in an earth orbit. The $F_{NS}$ component 22 is derived from data which consists of eight coefficients that represents an eighth order expression of sine and cosine functions. The present invention utilizes recursive formulations to obviate the necessity of loading all of the eight coefficients in an 8×8 gravitational model description in the satellites computer memory. This is because all eight of the above coefficients can be derived from just the first order term by recursive formulations. Thus, significant satellite computer memory can be conserved because only one coefficient is loaded to generate the $F_{NS}$ component 22.

Another advantage of such a formulation is the order, and consequently the accuracy of the gravitational model can be increased without any increase in memory. This is accomplished by extending the limits of the recursive relationship for evaluation and entails more computing times for progressively detailed models. Thus, with only one crosslink measurement per hour, the computing time is made more available than the computer memory.

The $F_{SRP}$ component 24 approximates the force due to solar radiation pressure encountered by a satellite in an earth orbit. The solar radiation pressure vector 20A is generated by a parametric curve stored in the system that provides the solar radiation pressure force as a function of the angle a satellite is with respect to the sun. The different angles a satellite is with respect to the sun corresponds to the different positions of a satellite in an earth trajectory. The curve is formed by parameters which are calculated by a solar radiation model that calculate and then combine the forces due to solar radiation pressure on all of the individual flat surfaces of a satellite. The model performs these calculations for all of the possible angles a satellite is positioned with respect to the sun in an earth trajectory.

The $F_{LSP}$ component 26 approximates the lunar and solar gravitational forces encountered by a satellite in an earth orbit. The forces due to the lunar gravity and solar gravity are well known.

The $F_{SET}$ component 28 is an optional part of the force model 28, which approximates the forces encountered by a satellite due to solid earth tides to provide further refinement to the force model.

The force components 20 are each coupled to an associated input of an adder 32. However, the $F_{TB}$ component 20 and $F_{NS}$ component 22 are each coupled to the adder 32 through a transform module 30A,30B. The Transform 30A, 30B adjusts the $F_{TB}$ component 20 and $F_{NS}$ component 22 to account for the irregularities in the earth orbit. The irregularities include short term wobble known as nutation, long term wobble known as precession and polar motion affects of the earth. The Transform 30A,30B is implemented as a Wahr Model which is well known and described in an article written by J. M. Wahr, Geophysical Journal of the Astronomical Society, Vol. 64, Pg. 705–727, an article written by Fliegel, entitled CLOSED FORM SUN, MOON AND NUTATION ALGORITHMS, Aerospace Report ATR-93 (3473)-1, January 1993 and an article written by Fergurson et al., entitled MODELING UT1-UTC AND POLAR MOTION ON-BOARD GPS SATELLITES, Navigation Journal, Institute of Navigation, Vol. 31, No. 3, Fall 1984.

The Adder 26 combines the force components 20A,22A, 24,26,28 to generate an equation of motion 34 that approximates the acceleration experienced by a satellite in an earth orbit. As is well known according to Newtonian Law, summing the forces exerted on a body describes the acceleration experienced by that body.

The equation of motion 34 is coupled to an integrator 36. The integrator 36 integrates the six first order equations of motion 34, as is well known, to produce an equation of motion 38 that approximates the displacement of the satellite. The displacement equation of motion 38 is an approximation of the satellites orbit or trajectory around the earth. Thus, the equation of motion 38 is in actuality a reference trajectory. As discussed earlier, the reference trajectory is utilized to predict the actual trajectory of the satellite.

The integrator 36 is a high precision single step numerical integrator that has coefficients optimized for earth trajectories. Such a configuration minimizes relative step-to-step error and absolute errors to less than 1.0E–12 parts, by comparison with an associated lower order Taylor series without any functional evaluations. This minimizes computational burden and enhances accuracy at minimal processing cost. In addition, a variable step size feature is incorporated that enables integration for as large a step as possible, subject only to the specified relative and absolute error tolerances. The variable step feature also allows the quadrature to reach precisely the exact shadow boundaries before the $F_{SRP}$ component 24 is changed, contributing to numerical precision.

In order to implement the integrator 36 on the GPS Computers, a special perturbation method is required. The method utilized is a modified version of Encke's method, which is described in the article written by Kyner et al., entitled MODIFIED ENCKE SPECIAL PERTURBATION METHOD, Astronomical Journal, Vol. 71, No. 7, September 1966. The method disclosed is a low risk approach that overcomes the inherent limitations of the reduced word length of the GPS Computers. This is accomplished by integrating separately the predominant force component of the force model 18 from the relatively smaller force components, which prevents the loss of the less significant bits. As discussed earlier, the predominant force component of the force model 18 is the $F_{TB}$ component 20.

Figure 3:
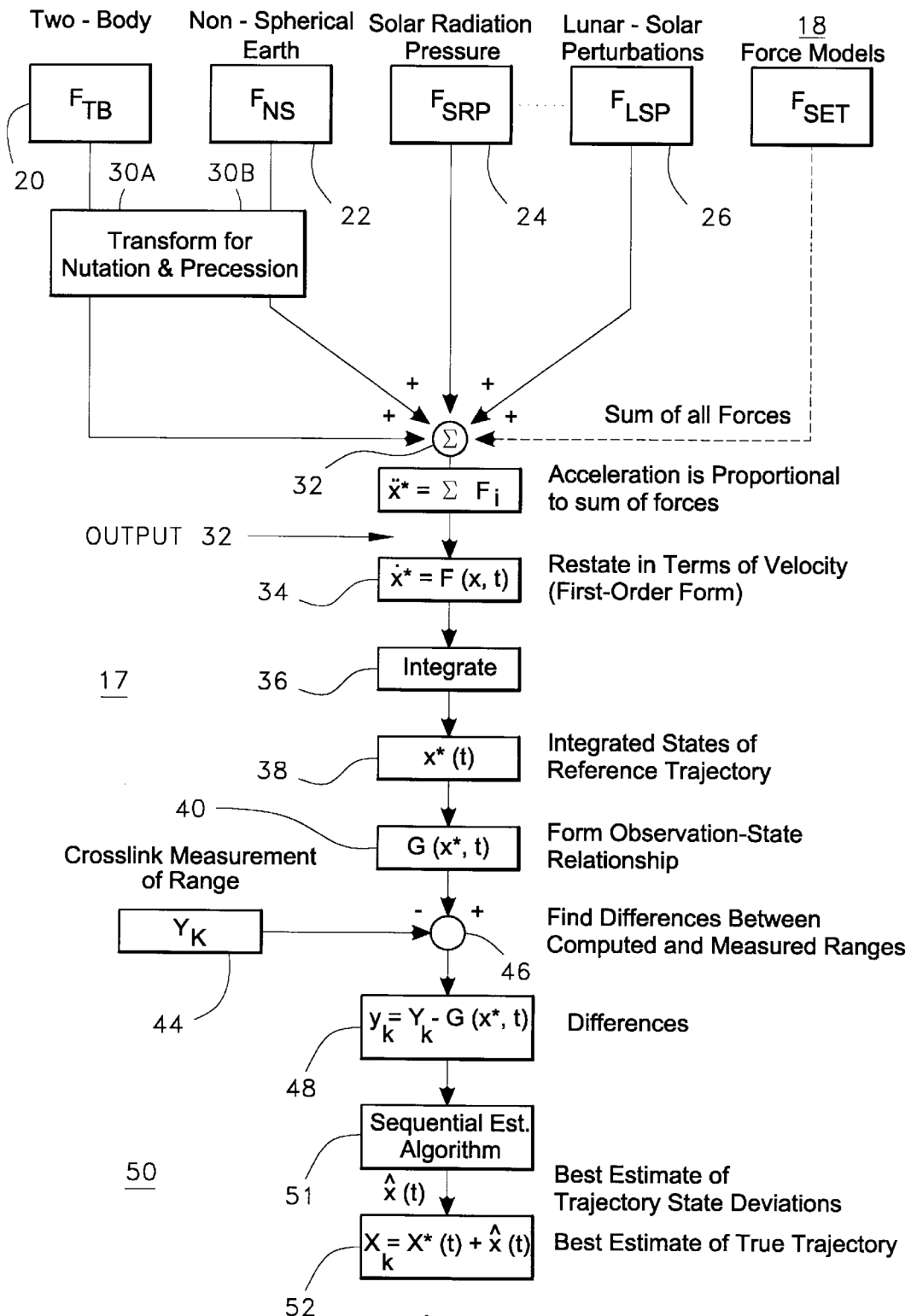
FIG. 3 is a block diagram of a system for on board prediction of a GPS Satellite trajectory according to the present invention.

Referring to FIG. 3, there is shown a block diagram of the system 17 for predicting the trajectories of GPS Satellites 12 according to the present invention. The system 17 is also configured to be implemented on the 1750A computers of the GPS System. The system 17 of the present invention predicts the trajectory of the satellite by further processing the reference trajectory 38 as described in FIG. 2. The same reference numerals from FIG. 2 are employed to reference like components and modules in FIG. 3. The system 17 includes all of the elements of FIG. 2 in order to generate the reference trajectory 38, as such these elements are the same exact elements as described in FIG. 2 and need not be further discussed.

The reference trajectory 38 is coupled to an observation state former 40. The observation state former 40 is utilized to convert the reference trajectory 38 into an Enhanced Kepler Parameter Form. This conversion is necessary in order to make the reference trajectory 38 compatible with the sequential estimator 50 of the present invention, which will be described in more detail later. Converting expressions into the Enhanced Kepler Parameter Form is a process which is well known and described in an article written by A. J. Van Dierendonck et al. on pg. 155–160. The Enhanced Kepler Form is a space vehicle ephemeris model, which approximates the full Keplerian Orbital Parameters. The Keplerian Orbital Parameters are approximated by an enhanced set of parameters, which are obtained by a nonlinear iterative least square curve fit process. The Enhanced Kepler Form is especially suited to the system 17 of the present invention because it eliminates the singularity that arises in the equations of motion due to small or zero eccentricity of the GPS orbits.

The Enhanced Kepler Parameter Form of the reference trajectory 4 is coupled to a positive input of a subtracter 46. Coupled to a negative input of the subtracter 46 is a $Y_k$ measurement 44 which is a crosslink measurement of range. The crosslink measurement of range is a measurement of the actual distance between a satellite and other similar GPS Satellites in orbit. The crosslink measurement of range is a correction factor utilized to adjust the reference trajectory. At an output of the subtracter 46 a $Y_k'$ expression 48 is produced, which is the reference trajectory adjusted for error by the $Y_k$ measurement 44.

The $Y_k'$ expression 48 is coupled to the input of a sequential estimator 51. The sequential estimator 51 is embodied as a Kalman Estimation Filter. The particular type of filter utilized is an extended version of the Kalman Estimation File in the factorized square root form. This type of filter is used to compensate for the relatively low precision arithmetic performed by the computers on board the GPS Satellites. The precision of the GPS computers is limited by the word length which is typically only 48 bits.

The square root form of the Kalman Estimation Filter is described in article written by Kaminski et al., entitled DISCRETE SQUARE ROOT FILTERING, Kalman Filtering: Theory and Application, IEEE Press, 1985, pg. 210. This form of the Kalman Estimation Filter was developed in order to deal with a significant class of filtering problems. This class of problems deal with the propagation of the error covariance matrix that results in a matrix which is not positive definite. Such an occurrence is a theoretical impossibility. To circumvent this problem, a method was developed that propagates the error covariance matrix in a square root form.

At the output of the sequential estimator 51 an $X_k$ expression 52 is produced, which is a best estimate or prediction of the trajectory of the satellite. The $X_k$ vector 52 is produced by combining the $Y_k'$ expression 48 with a trajectory state deviation.

While the invention has been particularly shown and described with reference to preferred embodiments thereof, it will be understood by those skilled in the art that changes in form and details may be made therein without departing from the spirit and scope of the present invention.

What is claimed is:

1. A system for predicting a trajectory of a satellite; comprising:
   a compact force model including force components that approximate the forces experienced by said satellite in an earth orbit, said force components include a two body force component, a non-spherical earth gravitational force component, a solar radiation pressure force component and a lunar-solar perturbation force component;
   an adder coupled to said compact force model for combining said force components to produce an equation of motion approximating the acceleration of said satellite; and
   means for integrating said equation of motion approximating the acceleration of said satellite to produce an equation of motion approximating the displacement of said satellite, said equation of motion approximating the displacement of said satellite being a reference trajectory;
   wherein said compact force model, adder and means for integrating are implemented on a programmable computer having a limited number of bits, said programmable computer being located on said satellite.

2. The system of claim 1, which further comprises a Wahr Model Transform coupled between said adder and, both said two body force component and said non-spherical earth gravitational force component to account for nutation, precession and polar motion affects of said earth orbit.

3. The system of claim 1, wherein said non-spherical earth gravitational force component is generated by recursive formulations.

4. The system of claim 1, wherein said two body force component is generated by calculating the gravitational attraction between said satellite and earth.

5. The system of claim 1, wherein said solar radiation pressure component is generated by a curve that provides the solar radiation pressure force as a function of the angle of said satellites with respect to the sun.

6. The system of claim 1, wherein said two lunar-solar perturbation force component is generated by summing both lunar and solar gravitational force exerted on said satellite.

7. The system of claim 1, wherein said integrating means is a single step numerical integrator that integrates said equation of motion approximating the acceleration of said satellite twice, wherein each integration is performed by separately integrating said two body force component from rest of said force components.

8. The system of claim 7, wherein said integrating means further includes a variable step size feature for quadrature of the equations of motion.

9. The system of claim 1, which further includes:
   means for forming said reference trajectory into an Enhanced Kepler Parameter Form;
   a subtracter for producing a difference expression, said difference expression is a difference between said reference trajectory in said Enhanced Kepler Parameter Form and a crosslink measurement of range; and
   a sequential estimator for generating a prediction of the trajectory of said satellite from said difference expression.

10. The system of claim 9, wherein said sequential estimator is a Kalman Estimation Filter coupled to said subtractor.

11. The system of claim 10, wherein said Kalman Estimation Filter is an extended version of the Kalman Estimation Filter in a factorized square root form.

12. A method for predicting a satellite's trajectory, said method being implemented on a programmable computer being located on said satellite and having a limited number of bits, said method comprising the steps of:
   generating a compact force model including force components that approximate the forces experienced by said satellite in an earth orbit, said force components include a two body force component, a non-spherical earth gravitational force component, luni-solar perturbations, a solar radiation pressure force component;
   combining said force components to produce an equation of motion approximating the acceleration of said satellite; and
   integrating said equation of motion approximating the acceleration of said satellite to produce an equation of motion approximating the displacement of said satellite, said equation of motion approximating the displacement of said satellite being a reference trajectory.

13. The method of claim 12, which further comprises the step of transforming both said body force component and said non-spherical earth gravitational force component to account for nutation, precession and polar motion affects of said earth orbit, before said combining step.

14. The method of claim 12, wherein said non-spherical earth gravitational force component is calculated by using recursive formulations.

15. The method of claim 12, wherein said two body force component is generated by calculating the gravitational attraction between said satellite and earth.

16. The method of claim 12, wherein said solar radiation pressure component is generated by a curve that provides the solar radiation pressure force as a function of the angle of said satellite with respect to the sun.

17. The method of claim 12, wherein said two lunar-solar perturbation force component is generated by summing both a lunar and a gravitational force exerted on said satellite.

18. The method of claim 14, wherein said integration is performed by a single step numerical integrator that integrates said equation of motion approximating the acceleration of said satellite twice, wherein each integration is performed by separately integrating said two body force component from rest of said force components.

19. The method of claim 14, which further comprises the step of:
   forming said reference trajectory into an Enhanced Kepler Parameter Form;
   subtracting said reference trajectory in said Enhanced Kepler Parameter Form from a crosslink measurement of range to produce a difference expression; and
   sequential estimating said difference expression to produce a prediction of a trajectory of said satellite.

20. The method of claim 19, wherein said sequential estimating is performed by an extended version of the Kalman Estimation Filter in the factorized square root form.

21. A method for predicting a satellite's trajectory, said method being implemented on said satellite and comprising the steps of:
   generating a compact force model including force components that approximate the forces experienced by said satellite in an earth orbit, said force components include a two body force component, a non-spherical earth gravitational force component, luni-solar perturbations, a solar radiation pressure force component;

combining said force components to produce an equation of motion approximating the acceleration of said satellite; and integrating said equation of motion approximating the acceleration of said satellite to produce an equation of motion approximating the displacement of said satellite;

measuring a value indicative of the actual position of said satellite; and, forming a predictive value from said equation of motion approximating the displacement of said satellite and said measured value.

22. The method of claim 21, wherein said measured value is a distance between said satellite and at least one other satellite.

* * * * *